United States Patent [19]

Tsui et al.

[11] 4,336,541
[45] Jun. 22, 1982

[54] SIMULTANEOUS SIGNAL DETECTOR FOR AN INSTANTANEOUS FREQUENCY MEASUREMENT RECEIVER

[75] Inventors: James B. Y. Tsui, Centerville; Rudy L. Shaw, Montgomery County; Joseph Caschera, Riverside, all of Ohio

[73] Assignee: The United States of America as represented by the Secretary of the Air Force, Washington, D.C.

[21] Appl. No.: 176,434

[22] Filed: Aug. 8, 1980

[51] Int. Cl.³ .............................................. G01S 7/36
[52] U.S. Cl. ................................ 343/18 E; 343/5 SA
[58] Field of Search ........................... 343/5 SA, 18 E

[56] References Cited

U.S. PATENT DOCUMENTS

| | | | |
|---|---|---|---|
| 4,146,892 | 3/1979 | Overman et al. | 343/5 SA X |
| 4,188,628 | 2/1980 | Langeraar et al. | 343/5 SA |
| 4,194,206 | 3/1980 | Tsui et al. | 343/18 E |
| 4,204,165 | 5/1980 | Ready | 343/5 SA |

*Primary Examiner*—T. H. Tubbesing
*Attorney, Agent, or Firm*—Donald J. Singer; Casimer K. Salys

[57] ABSTRACT

An apparatus for use in conjunction with an instantaneous frequency measurement (IFM) receiver, for detecting the presence of two or more RF signals, differing in frequency, between the onset of the first RF signal pulse and the completion of the frequency encoding strobe. High frequency sample and hold circuits detect the level of the video upon stabilization of the leading edge of the first received pulse. Thereafter, comparators monitor both the video and sampled levels to detect defined differences therebetween. Monitoring ceases at the termination of the frequency encode strobe. Ambiguities in the encode frequency are detected by comparator unbalances, which actuate the inputs to a logic OR gate. The output of the OR gate is connected to a logic AND gate, whose other input changes in level upon the termination of the encode strobe. The output of the AND gate latches an alarm, signalling the IFM receiver that the frequency measurement is ambiguous.

6 Claims, 7 Drawing Figures

SIMULTANEOUS SIGNAL DETECTOR FOR AN INSTANTANEOUS FREQUENCY MEASUREMENT RECEIVER

RIGHTS OF THE GOVERNMENT

The invention described herein may be manufactured and used by or for the Government of the United States for all governmental purposes without the payment of any royalty.

BRIEF SUMMARY

The present invention is directed to an apparatus used in conjunction with an instantaneous frequency measurement (IFM) receiver of the type utilized in radar signature detection and analysis. The apparatus overcomes the data processing problem occurring when the second of two differing frequency RF pulses is received at a point in time before the first pulse frequency is completely encoded. When the leading edges of the two RF pulses received are separated by a period greater than the settling time of the receiver video channels, the apparatus detects and signals the occurrence of the second, time-overlapping RF pulse. Consequently, the significant error rates normally associated with such time concurrent RF pulses are measurably reduced.

High speed sample and hold means are provided for measuring the video channel signal levels in the receiver immediately upon termination of the signal transient associated with the leading edge of the first RF pulse. Each video channel is monitored thereafter by comparator means to detect measurable changes between the sampled signal level and the signal level subjected to the frequency encoding strobe. The trailing edge of the encode strobe terminates the monitoring process until the onset of the succeeding IFM receiver sequence. Detection of a level difference, between the sampled and monitored signals, in any one of the channels, actuates a latching alarm to notify the IFM receiver that the encoded frequency data is ambiguous.

A variant of the invention comprises a combination of the above-described multiple RF pulse detector with an otherwise conventional detector responsive to RF pulses in which the leading edges coincide exactly in time. Together the two detect multiple RF pulses at any time through encoding, effectively supplanting each other inherent deficiencies.

DETAILED DESCRIPTION

Figure 1:
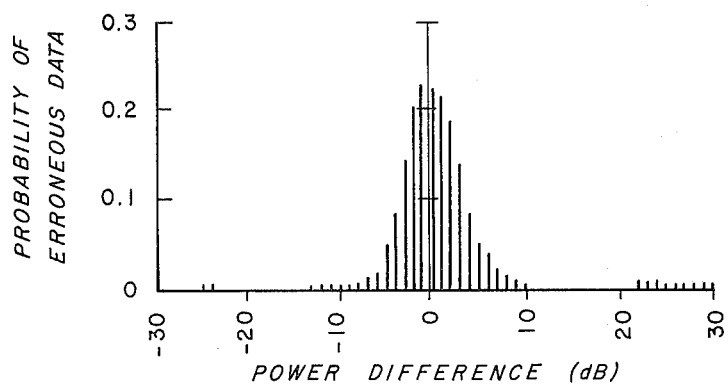
FIGS. 1, 2 and 3 are plots showing the probability of an IFM receiver encoding erroneous data, as a function of the levels separating the signal amplitudes, for RF pulses whose leading edges are concurrent, separated by 20 nsec, and separated by 60 nsec., respectively.

The instantaneous frequency measurement (IFM) receiver is an RF device used in electronic warfare applications to rapidly ascertain signal frequencies of pulse radars. Though the underlying design concepts are naturally beneficial in terms of size, weight, bandwidth and frequency resolution, the conventional design approaches lead to IFM receivers which are inherently susceptible to signal detection errors when receiving two or more signals of different frequencies. This is true whether the multiple signals coincide in time or arrive with only slight time delays therebetween.

The cause of the signal detection problem lies in the encoding step. When the second signal reaches the receiver before the initial signal is completely encoded there is a high probability that the encoded signal will be neither the former nor the latter of the two. The most influential variable altering the accuracy of the encoded signal is the relative time spacing between the leading edges of the two incoming signal pulses.

As a prelude to the detailed analysis of the invention and its embodiment, it may be useful to review the fundamental concepts defining the operation of IFM receivers. Generally, it may be said the IFM receivers measure the frequencies of incoming RF signals utilizing interferometric techniques by detecting the phase shift magnitudes produced in multiple, calibrated delay lines. For instance, the received RF signal is divided and simultaneously introduced into a non-delayed path and a delay line of known length $\tau$. Since the phase differences between the delayed and non-delayed receiver paths are functions of the input signal frequency, conversion of the phase difference signals to video provides signals whose amplitudes are related to the phase delay. Typically the functional relationship takes the form $\sin \omega\tau$ or $\cos \omega\tau$, where $\omega$ is the angular frequency of the processed RF signal. At some defined interval of time after the initial reception of the first RF signal, the amplitudes in the $\sin \omega\tau$ or $\cos \omega\tau$ signal channels are encoded for subsequent processing to determine the exact numerical value of $\omega$.

Characteristically to achieve wide, unambiguous bandwidths and fine frequency resolution it is necessary for the IFM receiver to have multiple delay lines, correlators and comparators, the latter two serving to increase the accuracy and confidence attributable to the frequency measurement. Naturally, then, the delay between the leading edge of the RF pulse and the strobe to encode a $\sin \omega\tau$ or $\cos \omega\tau$ amplitude can be no shorter than the length of time it takes for the signal to transition the longest delay line, correlator and encoding network. As a general rule, the strobe to encode a sample occurs less than 120 nsec after the leading edge of the first RF pulse.

As was noted hereinbefore, the deficiencies in the known art are associated with the reception of simultaneous, or near-simultaneous, RF pulses of differing frequencies. If the gap between the leading edges of the two RF pulses is measurably greater than the encode strobe duration, the receiver will detect and frequency encode only the leading RF signal. However, if the two RF pulses overlap with a time between leading edges less than the time to complete an encode strobe, the frequency encoded can be any one of three quantities, the first pulse frequency, the second pulse frequency, or an intermediate therebetween. Consequently, the IFM receiver conveys ambiguous frequency data.

The probability of obtaining erroneous frequency data from an IFM receiver processing multiple RF pulses is also influenced by their relative amplitudes.

Figure 2:
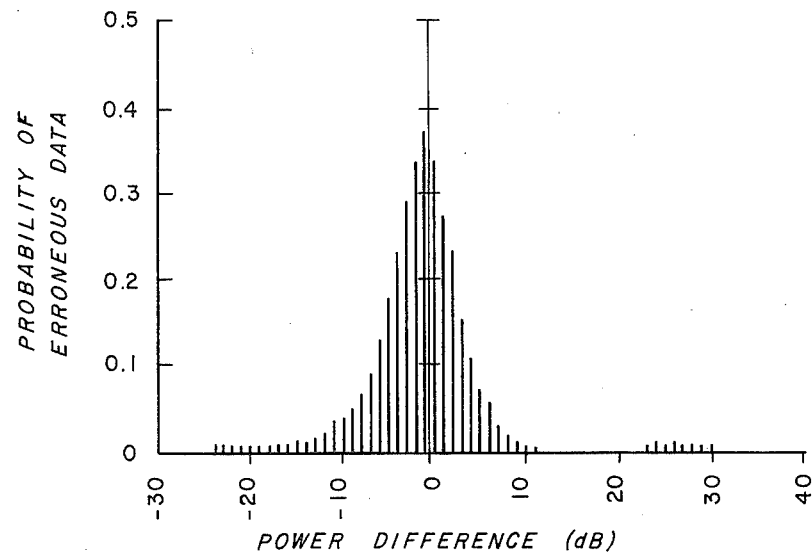
Figure 3:
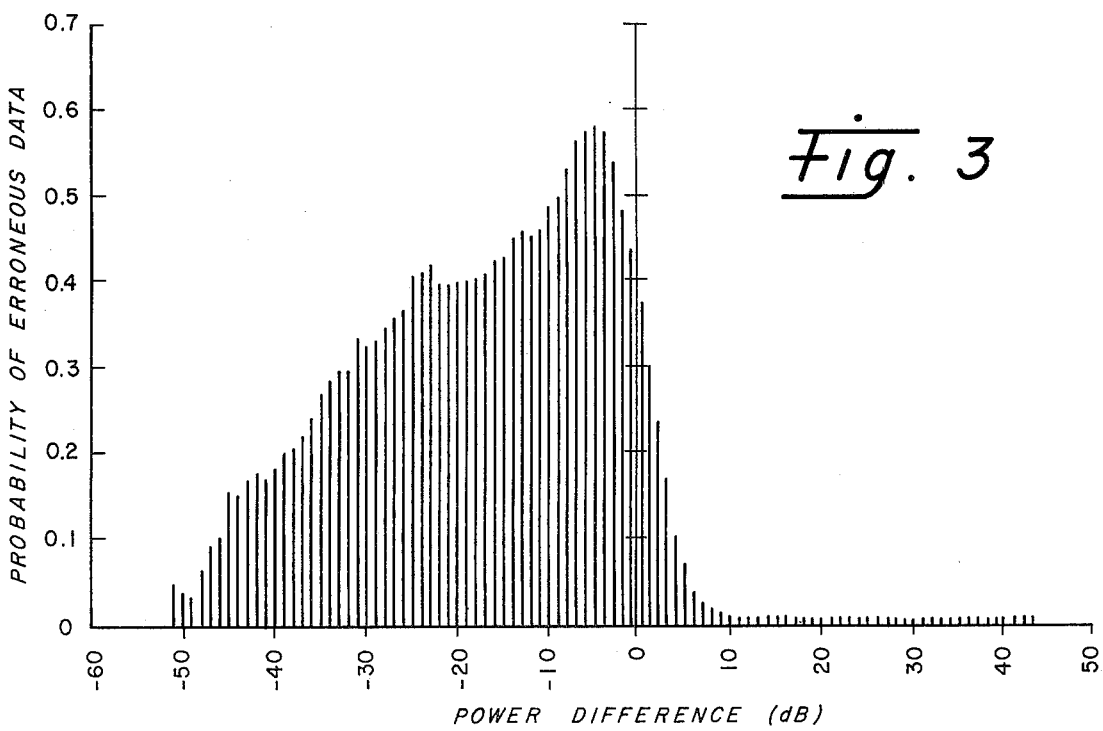

The effects of amplitude differences are best understood with reference to the plots presented in FIGS. 1, 2 and 3, representing actual results from a tested IFM receiver. FIG. 1 indicates the probability of encoding erroneous data with respect to the power difference in two RF signals when there is zero time delay between their leading edges—namely, simultaneous RF pulses. FIG. 2 shows the effects of a 20 nsec lag between the leading edges of the first and second pulses. The plot in FIG. 3 represents a 60 nsec delay. Undoubtedly, with a 60 nsec delay the receiver generates a very high percentage of erroneous data even when the RF signal amplitudes are separated by a power difference as great as 40 dB.

Recognizing that even a small percent of erroneous frequency data can cause the signal processor following the IFM receiver to measurably slow or completely malfunction, it is essential that the existence of simultaneous or near simultaneous RF pulses of different frequencies be detected. Once the concurrence is detected, the encoded frequency measurement can be disregarded or uniquely processed.

Figure 4:
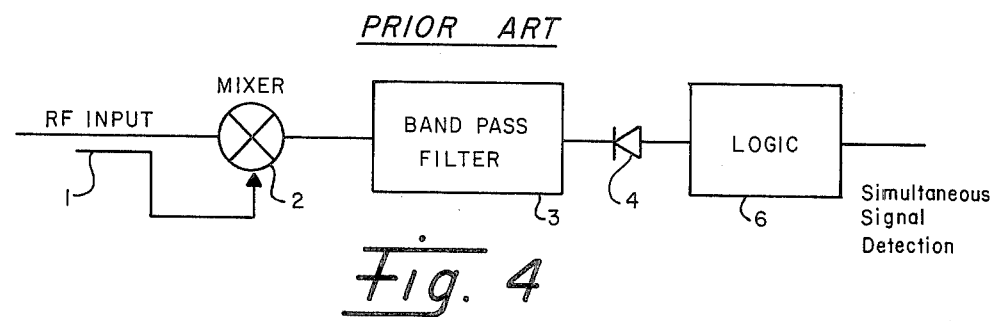
FIG. 4 schematically represents a known device for detecting multiple frequency RF pulses when their leading edges coincide in time.

A schematic block diagram of the conventional solution to detecting the presence of simultaneous or near-simultaneous RF pulses appears in FIG. 4. The circuit essentially contains power divider 1, mixer 2, bandpass filter 3, and detector 4, the latter driving a logic circuit element, 6, whose output state notifies the presence of simultaneous RF signals. The RF input to the circuit comes from a receiver front end which has a specific bandpass filter. In operation, if a single RF signal is introduced to the circuit, the mixer output will be comprised mainly of a DC component, a signal with harmonics of the incident frequency and a signal component of the original frequency. When bandpass filter 3 is selected to have an upper frequency limit which is lower than the minimum cutoff frequency of the receiver front end, no signal reaches detector 4.

In the alternate case, when two simultaneous RF signals are introduced into the circuit in FIG. 4, the difference frequency between the two is sufficiently low to pass through filter 3, detector 4 and into logic block 6. Undoubtedly, the lower frequency limit of the bandpass filter is governed by the proximity of the frequencies in the simultaneous signals. Practically, however, because of physical limitations on mixers and filters the convention circuit in FIG. 4 is restricted to detecting signals which are both substantially simultaneous and no more than a nominal 10 dB apart in terms of power.

Clearly one recognizes that the art is lacking in terms of circuits which detect near-simultaneous RF pulses, and particularly those having moderate differences in power. It is this void which the invention disclosed herein fills. As contemplated and embodied, the circuit does not degrade the pulse width detection capability of the IFM receiver while exhibiting an amplitude detection range consistent with the dynamic range of the receiver. In part, the technique recognizes that the time window necessary to precisely encode the video function is measurably greater than the time necessary to take a high speed, but low accuracy, sample of the video function at a point in time before the video signal has fully stabilized. Notwithstanding the lower accuracy of the high speed sample, it is sufficient to define a range, for comparison with the later encoded data, to conclude where the video function signal has undergone a significant change in amplitude.

Figure 5:
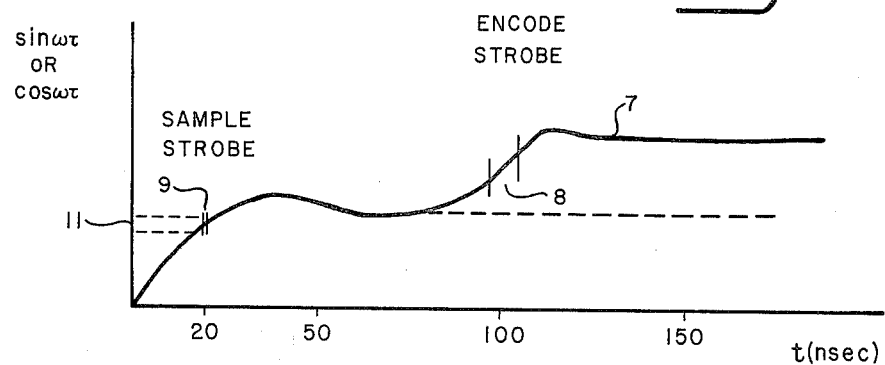
FIG. 5 is a time plot of the IFM receiver video signal having multiple pulses which are not concurrent in time.

The underlying concept is illustrated with reference to the signal plotted in FIG. 5. Plot 7 in FIG. 5 depicts the waveform of a representative video signal amplitude, either $\sin \omega\tau$ or $\cos \omega\tau$, as a function of time. The initial rise in amplitude represents the receipt of the first RF signal, while the second rise introduces the time period during which the receiver output exhibits the concurrent effects of two RF signals. Each increase in amplitude shows a small, inherent overshoot and a rise time of approximately 20 nsec. The encode strobe, 8, is shown to occur approximately 100 nsec after the first RF signal is detected, with a window of approximately 2 nsec. The narrow duration sample strobe is taken at approximately 20 nsec after onset of reception.

If, as taught herein, a tolerance range, 11, is established about the sample measurement, a subsequent comparison with the encoded data will immediately disclose the occurrence of change in the video signal amplitude, indicating the existence of one or more additional RF signals at a time preceeding the completion of encoding. In such case the erroneously encoded data is discarded.

The technique and embodying apparatus are particularly directed to sensing the existence of near-simultaneous RF signals when the leading edges of the first RF signal and any succeeding signal are separated in time, in contrast to a system of the form depicted in FIG. 4 which preferentially operates on completely simultaneous signals. By referring to the probability of error distributions plotted in FIGS. 1-3, and in particular FIG. 3, it becomes self-evident that the functionally described apparatus uniquely addresses the RF signal overlap most prone to high error rates. In actuality, however, the error rate with the invention incorporated can still approach the 20 nsec delay appearing in FIG. 2. The lower bound is due to the physical properties of the IFM receiver, which exhibits a rise time of approximately 20 nsec in the generating the $\sin \omega\tau$ or $\cos \omega\tau$ video signals. This response limitation inherently prohibits a sample strobe until more than 20 nsec after the onset of the RF pulse, thereby allowing succeeding RF pulses to enter undetected if their onset lies in the zero to 20 nsec range.

Figure 6:
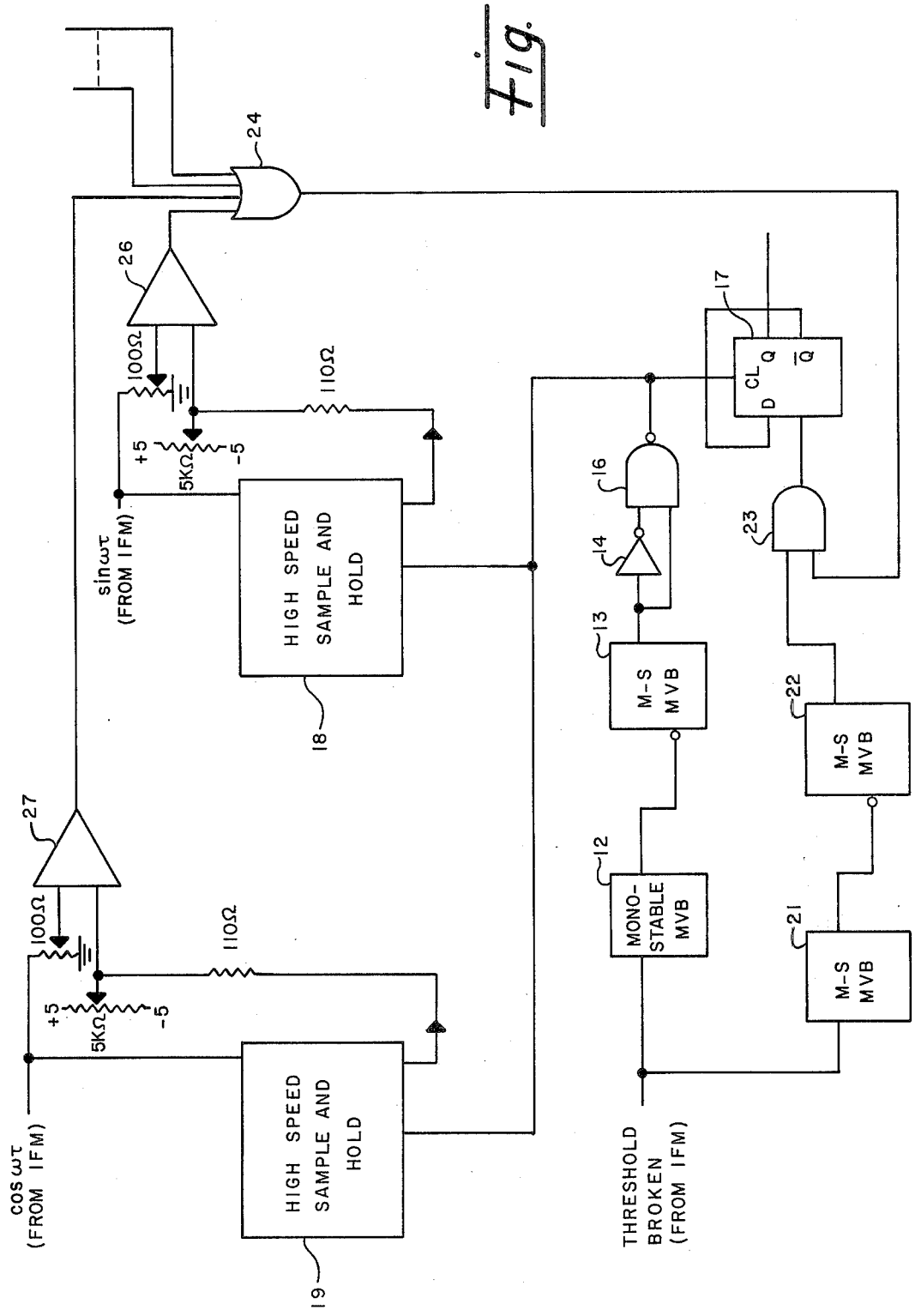
FIG. 6 contains a schematic of one embodiment.

Attention is now directed to FIG. 6, where one embodiment of the invention is schematically depicted. As shown, the video signals $\sin \omega\tau$ and $\cos \omega\tau$ are conveyed from the IFM receiver. Likewise, a threshold broken signal pulse is also furnished by the receiver to signal the onset of the first received RF pulse. The time locations and durations of sampling windows are prescribed by the functional blocks in the lower segment of the schematic, while the sampling and comparison functions are performed by those in the upper segment. Since the block shapes and titles define conventional electronic devices, the individual devices will not be described in extensive detail.

An analysis of the embodying electronic apparatus is preferably commenced with the window generating and timing elements. The leading edge of the threshold broken pulse triggers mono-stable multivibrator 12 into a high output state. The falling edge of multivibrator 12 initiates mono-stable multivibrator 13, whose output drives inverter 14 and NAND gate 16.

To illustrate the operating sequence, refer to the plot in FIG. 5. Zero time t corresponse to the leading edge of the threshold broken signal. The time delay introduced by multivibrator 12 sets the leading edge of the sample strobe, occurring at 20 nsec, while the parameteric delays in inverter 14 establish the duration of the 40 nsec sampling pulse. Once triggered, each sample and hold device measures over an internally controlled period of 200 psec. The mono-stability of multivibrator 13 insures a complete reset at the end of each sampling strobe. From FIG. 6 it is apparent that gate 16 both clears flip-flop 17 and actuates high speed sample and hold blocks 18 and 19 to record the amplitudes on IFM signal lines corresponding to sin $\omega\tau$ and cos $\omega\tau$, respectively.

Referring again to the lower portion of FIG. 6, there appears another, substantially parallel, set of mono-stable multivibrators designated 21 and 22, the latter driving one input to AND gate 23. The other input to gate 23 originates in OR gate 24. Upon satisfaction of the AND condition in gate 23 a signal is directed to D type flip-flop 17.

Operationally, the first multivibrator, 21, defines the time delay until the leading edge of the strobe window, actuating multivibrator 22 by its trailing edge. The encode strobe period is designated by reference numeral 8 in FIG. 5, with a duration corresponding to multivibrator 22. From the logic function performed in gate 23 it is recognized that flip-flop 17 will be actuated from its cleared state when a signal from gate 24 is time concurrent with the window defined by encode strobe period 8.

With an understanding of the timing at hand, it is now appropriate to consider the contribution of the electronic devices comprising the upper segment of the embodying apparatus in FIG. 6. Fundamentally, the blocks shown contain comparators 26 and 27, with otherwise conventional ancillary circuitry for comparing the two signal levels of interest. Comparator 26 compares the level of the video signal sin $\omega\tau$ with the output of sample and hold block 18, while comparator 27 does likewise between the cos $\omega\tau$ signal and the output of block 19. The outputs of both comparators serve as inputs to OR gate 24.

Recalling the operation of the blocks in the lower segment of FIG. 6, and the time plot in FIG. 5, it becomes apparent that the sin $\omega\tau$ and cos $\omega\tau$ signals measured during the sample strobe are compared to their values at the encode strobe to determine if an amplitude rise, associated with another RF pulse, is detected. If detected, flip-flop 17 is latched until the succeeding sequence to forewarn of an erroneous frequency measurement.

As was described with reference to the plot in FIG. 5, tolerance band 11 is established about the output levels of sample and hold blocks 18 and 19 to avoid noise induced actuation of comparator elements 26 and 27. Techniques for establishing such comparator deadbands are commonly known.

Figure 7:
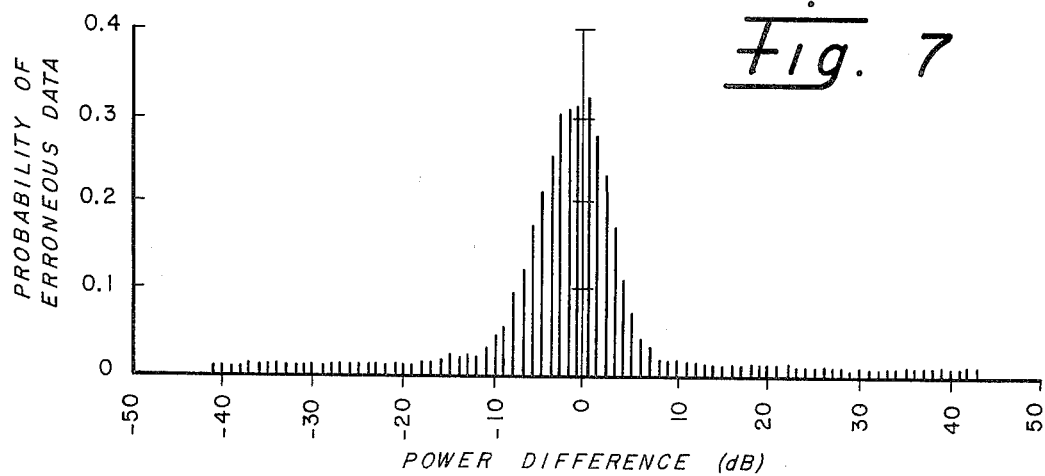
FIG. 7 is a plot of receiver encoding error rate when operated with the embodying apparatus and a 60 nsec delay between pulses.

A test of the circuit depicted in FIG. 6, under the conditions corresponding to the probability of error distribution plotted in FIG. 3, showed a reduction to the levels plotted in FIG. 7. As is fairly self-evident, the likelihood of erroneous data was dramatically reduced without otherwise degrading the fundamental performance characteristics of the IFM receiver.

The conventional attributes flowing from uses of multiple $\tau$ values in the IFM receiver are fully utilized in the simultaneous signal detection circuit taught herein. Note in FIG. 6 that OR gate 24 depicts the presence of a multiplicity of inputs, in excess of those originating in comparators 26 and 27. As additional video channels, with different values of $\tau$, are added to the IFM receiver, their contribution to the simultaneous signal detection circuit entails the mere addition of the comparator and sample and hold elements into preexisting OR gate 24.

The underlying principles of the invention, as shown in the context of an embodying apparatus, allows the detection of ambiguous RF data when the first and second pulses are slightly shifted in time relative to each other. A further variant of the invention selectively combines the simultaneous signal detection circuit of the prior art, typified by that in FIG. 4, with a circuit embodying the invention disclosed herein, to overlap the beneficial characteristic of each. Consequently, whether the second RF source pulse arrives simultaneously or slightly delayed, its presence is detected and the ambiguous IFM data suppressed. Furthermore, the combination of techniques provides detection over the full range of time prior to the frequency encode strobe, and over the substantial majority of the receiver's dynamic range.

We claim:

1. An apparatus for detecting the receipt of two or more RF signals, differing in frequency and arrival time, in the video stage of an instantaneous frequency measurement receiver, comprising:

means for converting RF frequencies to proportional video stage voltage levels;

means for sampling the voltage levels, in the means for converting, upon stabilization of the video voltage levels immediately succeeding the reception of the first RF pulse;

means for comparing the sampled video stage voltage levels with the video levels later in time, and providing an output signal when the levels later in time are not substantially equal to the sampled levels; and means for terminating the comparison upon completion of the frequency measurement encoding by the receiver.

2. The apparatus recited in claim 1, wherein the means for sampling comprises a high speed sample and hold circuit actuated by a timed strobe command occurring at a fixed point in time after the leading edge of the first RF pulse received.

3. The apparatus recited in claim 2, wherein the means for converting RF frequencies comprises an IFM receiver, and the means for terminating the comparison comprises a reversible logic gate set to its high state by the sample and hold strobe and returned to its low state at the termination of encoding period.

4. The apparatus recited in claim 3 wherein the IFM receiver generates a multiplicity of video stage voltage levels, and the means for comparing are connected to the input gates of a common logic OR device.

5. The apparatus recited in claims 1, 2, 3 or 4, further containing a device for detecting the receipt of two or more RF pulses, differing in frequency but concurrent in time.

6. The apparatus recited in claim 5, wherein said device contains an RF signal power divider, a mixer connected to said divider, and a bandpass filter after the mixer, to detect beats in the RF signal.

* * * * *